(12) United States Patent
Yamane et al.

(10) Patent No.: US 9,644,115 B2
(45) Date of Patent: *May 9, 2017

(54) FLUOROCHEMICAL COATING COMPOSITION AND ARTICLE TREATED THEREWITH

(71) Applicant: Shin-Etsu Chemical Co., Ltd., Tokyo (JP)

(72) Inventors: Yuji Yamane, Annaka (JP); Takashi Matsuda, Annaka (JP); Ryusuke Sakoh, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 14/663,799

(22) Filed: Mar. 20, 2015

(65) Prior Publication Data

US 2015/0275046 A1    Oct. 1, 2015

(30) Foreign Application Priority Data

Mar. 31, 2014    (JP) .................................. 2014-074094

(51) Int. Cl.
```
B32B 27/00      (2006.01)
C09D 183/14     (2006.01)
C03C 17/30      (2006.01)
C09D 183/12     (2006.01)
C08G 77/24      (2006.01)
C08G 77/46      (2006.01)
```

(52) U.S. Cl.
CPC ............ *C09D 183/14* (2013.01); *C03C 17/30* (2013.01); *C09D 183/12* (2013.01); *C03C 2217/76* (2013.01); *C08G 77/24* (2013.01); *C08G 77/46* (2013.01); *Y10T 428/31612* (2015.04); *Y10T 428/31663* (2015.04)

(58) Field of Classification Search
CPC ... C03C 17/30; C03C 2217/76; C09D 183/14; C09D 183/12; C08G 77/46; C08G 77/24; Y10T 428/31612; Y10T 428/31663; C08L 83/00

See application file for complete search history.

(56) References Cited

U.S. PATENT DOCUMENTS

| | | | |
|---|---|---|---|
| 8,022,161 B2 | 9/2011 | Yamane et al. | |
| 8,362,186 B2 | 1/2013 | Yamane et al. | |
| 2013/0136928 A1* | 5/2013 | Yamane | C09D 183/16 428/410 |

FOREIGN PATENT DOCUMENTS

| | | |
|---|---|---|
| JP | 2003-238577 | 8/2003 |
| JP | 2008-88412 | 4/2008 |
| JP | 2009-30039 | 2/2009 |
| JP | 2009-173787 | 8/2009 |
| JP | 2013-136833 | 7/2013 |

OTHER PUBLICATIONS

STIC Search Report dated Aug. 23, 2016.*
Japanese Office Action issued Oct. 11, 2016 in Japanese Application 2014-074094.

* cited by examiner

*Primary Examiner* — Eisa Elhilo
(74) *Attorney, Agent, or Firm* — Oblon, McClelland, Maier & Neustadt, L.L.P.

(57) ABSTRACT

A fluorochemical coating composition is provided comprising (A) a hydrolyzable group-containing silane modified with a fluoropolyether-containing polymer and (B) a hydrolyzable group-containing silane modified with a fluoropolyether-polysiloxane copolymer in a weight ratio (A)/(B) of 40/60 to 95/5. The composition forms on a substrate a water/oil repellent layer which does not detract from the visibility of the substrate.

16 Claims, No Drawings

FLUOROCHEMICAL COATING COMPOSITION AND ARTICLE TREATED THEREWITH

CROSS-REFERENCE TO RELATED APPLICATION

This non-provisional application claims priority under 35 U.S.C. §119(a) on Patent Application No. 2014-074094 filed in Japan on Mar. 31, 2014, the entire contents of which are hereby incorporated by reference.

TECHNICAL FIELD

This invention relates to a coating composition comprising a fluoropolyether-containing polymer-modified silane and an article treated therewith. More particularly, it relates to a fluorochemical coating composition comprising a hydrolyzable group-containing silane modified with a fluoropolyether-containing polymer and/or a partial hydrolytic condensate thereof, and a hydrolyzable group-containing silane modified with a fluoropolyether-polysiloxane copolymer and/or a partial hydrolytic condensate thereof, the composition forming a coating having water/oil repellency and low dynamic friction, and an article treated therewith.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an increasing need for technology to attain fingerprint proofness or easy stain removal on a surface of a display for better appearance or visibility. The prior art water/oil repellent agents can form films having the advantages of high water/oil repellency and easy stain wipe-off. However, since these agents tend to agglomerate together, they are difficult to form flat or smooth films, and haze often becomes a problem. It is thus desired to develop a treating agent and method capable of forming a high-performance film in a consistent manner while suppressing any haze increase.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically alkoxysilyl) in the molecule. In the presence of airborne moisture or the like, the alkoxysilyl groups undergo self-condensation reaction to form a coating. As the alkoxysilyl groups form chemical and physical bonds with the surface of glass or metal, the coating becomes a tough coating having durability.

Patent Document 1 discloses a linear fluoropolyether group-containing silane represented by the formula shown below.

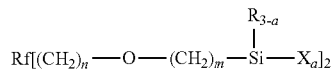

Herein Rf is a divalent linear fluoropolyether group, R is $C_1$-$C_4$ alkyl or phenyl, X is a hydrolyzable group, n is an integer of 0 to 2, m is an integer of 1 to 5, and a is 2 or 3. When treated with this fluoropolyether group-containing silane, glass, antireflective coatings and other substrates are improved in lubricity, parting property and wear resistance. However, since a non-fluorinated group is included in the terminal groups, there is a chance that non-fluorinated groups agglomerate together during or after the coating step, detracting from transparency and other optical properties of the substrate.

CITATION LIST

Patent Document 1: JP-A 2003-238577
Patent Document 2: JP-A 2013-136833
Patent Document 3: JP-A 2008-088412
Patent Document 4: JP-A 2009-030039

DISCLOSURE OF INVENTION

An object of the invention is to provide a fluorochemical coating composition capable of consistently forming on a substrate a water/oil repellent film which does not detract from the visibility of the substrate, and an article treated with the coating composition.

As mentioned above, the inventors previously proposed a fluoropolyether-containing polymer modified silane having a hydrolyzable group (Patent Document 1). A coating composition based on the polymer-modified silane has the problem that the agglomeration tendency makes it difficult to form a flat or smooth film unless treating conditions are carefully controlled.

The inventors also proposed in Patent Document 2 a mixture of a fluoropolyether-containing silane and a non-functional fluoropolyether. When the mixture is coated onto a glass plate to an average thickness of about 10 nm, irregularities on the coating surface are suppressed to the order of several nanometers. However, as the coating thickness is increased, it becomes difficult to suppress surface irregularities, depending on the type of substrate and the coating technique. As a result, haze increases to detract from visibility.

Specifically, a polymer having a fluoropolyether structure backbone and containing a hydrolyzable group at an end of the molecular chain has a chance that polymer molecules agglomerate together due to interaction between alkoxysilyl groups. When the polymer surface as coated is analyzed by atomic force microscopy (AFM), irregularities beyond the monomolecular layer thickness (10 nm) are sometimes observed. A similar phenomenon occurs when a single end-functionalized treating agent is used. These treating agents are improved by admixing a non-functional fluoropolyether therein. There is a tendency that the effect becomes less when the film is coated beyond 10 nm.

The inventors have discovered that the agglomeration problem is solved by adding a hydrolyzable group-containing silane modified with a fluoropolyether-polysiloxane copolymer to a fluorochemical coating composition comprising a polymer having a fluoropolyether structure backbone and containing a hydrolyzable group at an end.

It is noted that Patent Documents 3 and 4 disclose a silane modified with a perfluoropolyether-polysiloxane copolymer, which when used alone, gives a surface which has less irregularities, but is not sufficient in oil wipe-off.

Accordingly, in one aspect, the invention provides a fluorochemical coating composition comprising (A) a hydrolyzable group-containing silane modified with a fluoropolyether-containing polymer and/or a partial hydrolytic condensate thereof, and (B) a hydrolyzable group-containing silane modified with a fluoropolyether-polysiloxane copolymer and/or a partial hydrolytic condensate thereof, in a weight ratio (A)/(B) of 40/60 to 95/5.

In a preferred embodiment, component (A) contains 10 to 200 repeating units of the general formula (1):

$$—C_gF_{2g}O— \quad (1)$$

wherein g is independently in each unit an integer of 1 to 6, as the fluoropolyether group, and has at least one hydrolyzable silyl group of the general formula (2):

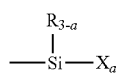
$$(2)$$

wherein R is $C_1$-$C_4$ alkyl or phenyl, X is a hydrolyzable group, and a is 2 or 3, at one or more ends, and component (B) contains 10 to 200 repeating units of the general formula (1) as the fluoropolyether portion, and 3 to 200 siloxane bonds as the polysiloxane portion.

In a preferred embodiment, the hydrolyzable group-containing silane modified with a fluoropolyether-containing polymer (A) is at least one member selected from fluoropolyether-containing polymer-modified silanes having the general formulae (3), (4), (5) and (6).

$$A\text{-Rf-QZ(W)}_\alpha \quad (3)$$

$$\text{Rf-(QZ(W)}_\alpha)_2 \quad (4)$$

$$A\text{-Rf-Q-(Y)}_\beta B \quad (5)$$

$$\text{Rf-(Q-(Y)}_\beta B)_2 \quad (6)$$

Herein Rf is —$(CF_2)_d$—O— $(CF_2O)_p(CF_2CF_2O)_q$ $(CF_2CF_2CF_2O)_r$—$(CF_2CF_2CF_2CF_2O)_s(CF(CF_3)CF_2O)_t$—$(CF_2)_d$—, d is independently an integer of 0 to 5, p, q, r, s and t are each independently an integer of 0 to 200, p+q+r+s+t is an integer of 10 to 200, individual units in parentheses may be randomly arranged; A is fluorine, hydrogen, or a monovalent fluorinated group terminated with —$CF_3$, —$CF_2H$ or —$CH_2F$ radical; Q is a single bond or an optionally fluorinated divalent organic group; Z is a single bond, a trivalent group: -JC= (wherein J is an alkyl, hydroxyl or silyl ether group: $K_3SiO$— wherein K is independently hydrogen, alkyl, aryl or alkoxy), a trivalent group: -LSi= (wherein L is alkyl), a tetravalent group: —C≡, a tetravalent group: or a di- to octavalent siloxane residue; W is a hydrolyzable group-bearing group having the general formula (7):

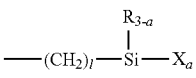
$$(7)$$

wherein R is $C_1$-$C_4$ alkyl or phenyl, X is a hydrolyzable group, a is 2 or 3, and l is an integer of 0 to 10; a is an integer of 1 to 7; Y is a hydrolyzable group-bearing divalent group having the general formula (8), (9), (10) or (10'):

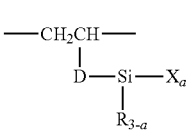
$$(8)$$

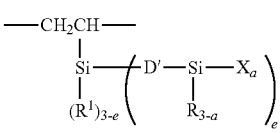
$$(9)$$

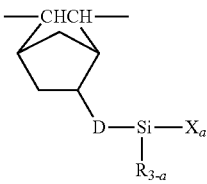
$$(10)$$

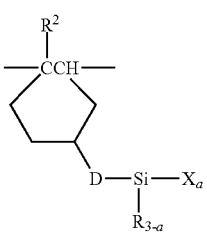
$$(10')$$

wherein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, $R^2$ is hydrogen or methyl, and e is 1 or 2; β is an integer of 1 to 10; and B is hydrogen, $C_1$-$C_4$ alkyl or halogen.

In a preferred embodiment, the hydrolyzable group-containing silane modified with a fluoropolyether-polysiloxane copolymer (B) is at least one member selected from fluoropolyether-polysiloxane copolymer-modified silanes having the general formulae (11) and (12).

$$A\text{-Rf'-QZW}_\alpha \quad (11)$$

$$\text{Rf'-(QZW}_\alpha)_2 \quad (12)$$

Herein Rf' is a divalent group containing fluoropolyether-polysiloxane copolymer; A, Q, Z, W, and α are as defined above.

More preferably, Rf' in formulae (11) and (12) is a group having the general formula (13) or (14).

$$—(Z'\text{-Q})_h\text{-Rf-(Q-Z')}_h— \quad (13)$$

$$—\text{Rf-(Q-Z'-Q-Rf)}_i— \quad (14)$$

Herein Rf and Q are as defined above, Z' is each independently a divalent polysiloxane chain, h is independently 0 or 1, and i is an integer of 1 to 3.

More preferably, Z' in formulae (13) and (14) is a polysiloxane chain having the general formula (15) or (16):

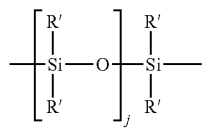
(15)

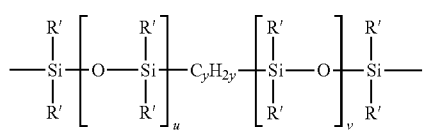
(16)

wherein R' is each independently $C_1$-$C_4$ alkyl, phenyl or phenylethyl, j is an integer of 10 to 200, y is an integer of 1 to 5, u and v are each independently an integer of 1 to 200.

In a preferred embodiment, the fluorochemical coating composition may further comprise (C) a fluoropolyether-containing polymer having the general formula (17):

A-Rf-A (17)

wherein Rf and A are as defined above.

Typically, the fluorochemical coating composition further comprises a fluorochemical solvent.

Also contemplated herein is an article treated with the fluorochemical coating composition defined above. Preferred embodiments include a touch panel, antireflective coated article, glass, strengthened glass, sapphire glass, quartz glass, and $SiO_2$-deposited substrate, which have been treated with the fluorochemical coating composition.

Advantageous Effects of Invention

When a substrate or article is treated with the fluorochemical coating composition, the resulting coating presents a flat and smooth surface which is water/oil repellent. The treatment with the fluorochemical coating composition not only imparts antifouling performance without detracting from the transparency, texture and other properties of the substrate, but also protects the substrate from chemical attacks and maintains antifouling performance over a long term.

Description of Preferred Embodiments

The notation (Cn-Cm) means a group containing from n to m carbon atoms per group. Me stands for methyl, Et for ethyl, and Ph for phenyl. Mw is a weight average molecular weight.

One embodiment of the invention is a fluorochemical coating composition comprising (A) a hydrolyzable group-containing silane modified with a fluoropolyether-containing polymer and/or a partial hydrolytic condensate thereof, and (B) a hydrolyzable group-containing silane modified with a fluoropolyether-polysiloxane copolymer and/or a partial hydrolytic condensate thereof. Components (A) and (B) are present in a weight ratio of 40/60 to 95/5.

When the fluorochemical coating composition comprising components (A) and (B) is applied to a glass substrate or $SiO_2$-deposited substrate (i.e., substrate having $SiO_2$ deposited thereon by evaporation or sputtering) by spraying, inkjet coating, spin coating, dipping or vacuum evaporation, the treated substrate or antifouling article has the advantage that a water/oil repellent film having a flat and smooth surface is consistently formed, over the antifouling article which is coated solely with component (A).

In one embodiment, component (A) is a silane containing 10 to 200, preferably 20 to 100 repeating units of the general formula (1):

(1)

wherein g is independently in each unit an integer of 1 to 6, as the fluoropolyether group, and having at least one hydrolyzable silyl group of the general formula (2):

(2)

wherein R is $C_1$-$C_4$ alkyl or phenyl, X is a hydrolyzable group, and a is 2 or 3, at one or more ends, preferably at one end.

Further, component (A) has at least one hydrolyzable group-containing silyl group of formula (2), preferably 1 to 12 hydrolyzable silyl groups, and desirably a plurality of hydrolyzable groups X, preferably 2 to 36, more preferably 2 to 18 hydrolyzable groups.

Examples of the repeating unit of formula (1), which is the fluoropolyether group, are shown below. It is understood that the fluoropolyether group may be composed of repeating units of one type or combination of two or more types, while individual repeating units may be randomly arranged.

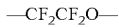

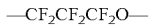

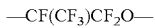

—$CF_2CF_2CF_2CF_2CF_2O$—

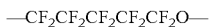

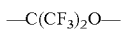

In formula (2), R is a $C_1$-$C_4$ alkyl group such as methyl, ethyl, propyl or butyl, or a phenyl group.

X is a hydrolyzable group. Suitable hydrolyzable groups include $C_1$-$C_{10}$ alkoxy groups such as methoxy, ethoxy, propoxy and butoxy, $C_1$-$C_6$ haloalkoxy groups such as trifluoromethoxy, trifluoroethoxy, and trichloroethoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo. Inter alfa, methoxy, ethoxy, isopropenoxy and chloro are preferred.

Preferably, the hydrolyzable group-containing silane modified with a fluoropolyether group as component (A) is at least one member selected from fluoropolyether group-containing polymer-modified silanes having the general formulae (3), (4), (5), and (6).

A-Rf-QZ(W)$_\alpha$ (3)

Rf-(QZ(W)$_\alpha$)$_2$ (4)

A-Rf-Q-(Y)$_\beta$B (5)

Rf-(Q-(Y)$_\beta$B)$_2$ (6)

Herein Rf is —$(CF_2)_d$—O—$(CF_2O)_p(CF_2CF_2O)_q$ $(CF_2CF_2CF_2O)_r$—$(CF_2CF_2CF_2CF_2O)_s(CF(CF_3)CF_2O)_t$— $(CF_2)_d$—, d is independently an integer of 0 to 5, p, q, r s and t are each independently an integer of 0 to 200, p+q+r+s+t is an integer of 10 to 200, individual units in parentheses may be randomly arranged. "A" is fluorine, hydrogen, or a monovalent fluorinated group terminated with —$CF_3$, —$CF_2H$ or —$CH_2F$ radical. Q is a single bond or an optionally fluorinated divalent organic group. Z is a single bond, a trivalent group: -JC≡ (wherein J is an alkyl, hydroxyl or silyl ether group: $K_3$SiO— wherein K is independently hydrogen, alkyl, aryl or alkoxy), a trivalent group: -LSi≡ (wherein L is alkyl), a tetravalent group: —C≡, a tetravalent group: —Si≡, or a di- to octavalent siloxane residue. W is a hydrolyzable group-bearing group having the general formula (7):

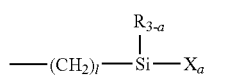
(7)

wherein R, X, and a are as defined above, and l is an integer of 0 to 10. The letter α is an integer of 1 to 7. Y is a hydrolyzable group-bearing divalent group having the general formula (8), (9), (10) or (10'):

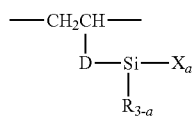
(8)

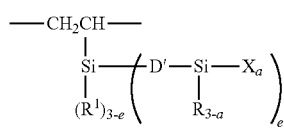
(9)

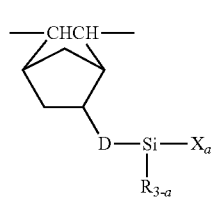
(10)

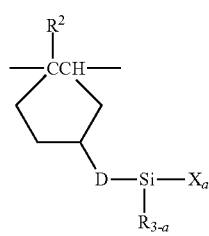
(10')

wherein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, $R^2$ is hydrogen or methyl, and e is 1 or 2. The letter β is an integer of 1 to 10. B is hydrogen, $C_1$-$C_4$ alkyl or halogen.

In formulae (3) to (6), Rf is —$(CF_2)_d$—O—$(CF_2O)_p$ $(CF_2CF_2O)_q$—$(CF_2CF_2CF_2O)_r$$(CF_2CF_2CF_2CF_2O)_s$(CF$(CF_3)CF_2O)_t$—$(CF_2)_d$—. Herein d is independently an integer of 0 to 5, preferably 0 to 2, more preferably 1 or 2; p, q, r, s and t are each independently an integer of 0 to 200, preferably p is an integer of 5 to 100, q is an integer of 5 to 100, r is an integer of 0 to 100, s is an integer of 0 to 50, t is an integer of 0 to 100, and the sum p+q+r+s+t is an integer of 10 to 200, preferably 20 to 100. Individual units in parentheses may be randomly arranged.

Examples of Rf are shown below.

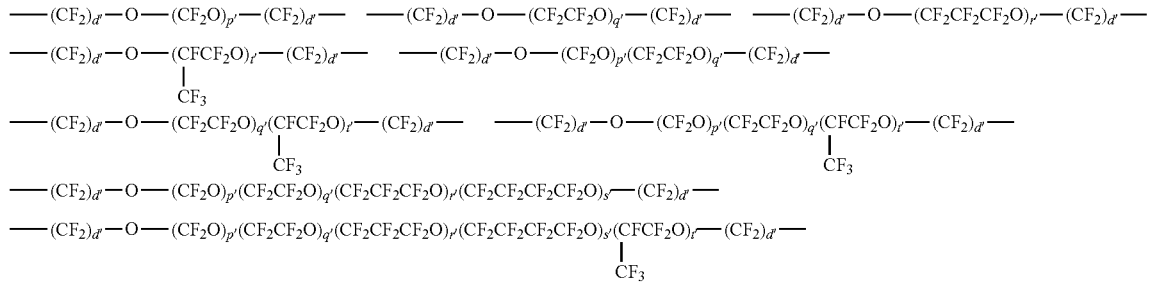

Herein d' is an integer of 0 to 5, preferably 0 to 2, and more preferably 1 or 2; p' is an integer of 10 to 200, preferably 20 to 100; q' is an integer of 10 to 200, preferably 20 to 100; r' is an integer of 10 to 200, preferably 20 to 100; s' is an integer of 0 to 50, preferably 0 to 30, and more preferably 1 to 30; t' is an integer of 10 to 200, preferably 20 to 100; the sum p'+q'+r'+s'+t' is an integer of 10 to 200, preferably 20 to 100.

In formulae (3) and (5), "A" is fluorine, hydrogen, or a monovalent fluorinated group terminated with —$CF_3$, —$CF_2H$ or —$CH_2F$ radical. Examples of the monovalent fluorinated group are shown below.

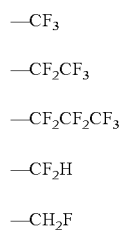

In formulae (3) to (6), Q is a single bond or an optionally fluorinated divalent organic group. Differently stated, Q is a linker between Rf and the terminal group. Preferably Q is a substituted or unsubstituted, divalent organic group of 2 to 12 carbon atoms which may contain one or more structures selected from the class consisting of an amide bond, ether bond, ester bond, and diorganosilylene group (e.g., dimethylsilylene), more preferably a substituted or unsubstituted, divalent hydrocarbon group of 2 to 12 carbon atoms which may contain the above structure.

Suitable substituted or unsubstituted, divalent hydrocarbon groups of 2 to 12 carbon atoms include alkylene groups such as ethylene, propylene (trimethylene or methylethylene), butylene (tetramethylene or methylpropylene), hexamethylene, and octamethylene, arylene groups such as phenylene, combinations of two or more of the foregoing, such as alkylene-arylene groups, and substituted forms of the foregoing in which some or all hydrogen atoms are substituted by halogen atoms such as fluorine. Inter alia, substituted or unsubstituted $C_2$-$C_4$ alkylene groups and phenylene are preferred.

Examples of Q are shown below.

ably di- to tetravalent siloxane residue. Where a siloxane bond is contained, a chainlike or cyclic organopolysiloxane residue of 2 to 13 silicon atoms, especially 2 to 5 silicon atoms is preferred. Also a silalkylene structure having two silicon atoms bonded via an alkylene group, that is, Si—$(CH_2)_n$—Si wherein n is an integer of 2 to 6 may be contained. Specifically, the organopolysiloxane residue has a $C_1$-$C_8$, preferably $C_1$-$C_4$ alkyl group such as methyl, ethyl, propyl or butyl, or phenyl group. The alkylene moiety in the silalkylene structure is of 2 to 6 carbon atoms, preferably 2 to 4 carbon atoms.

The group represented by Z is exemplified below.

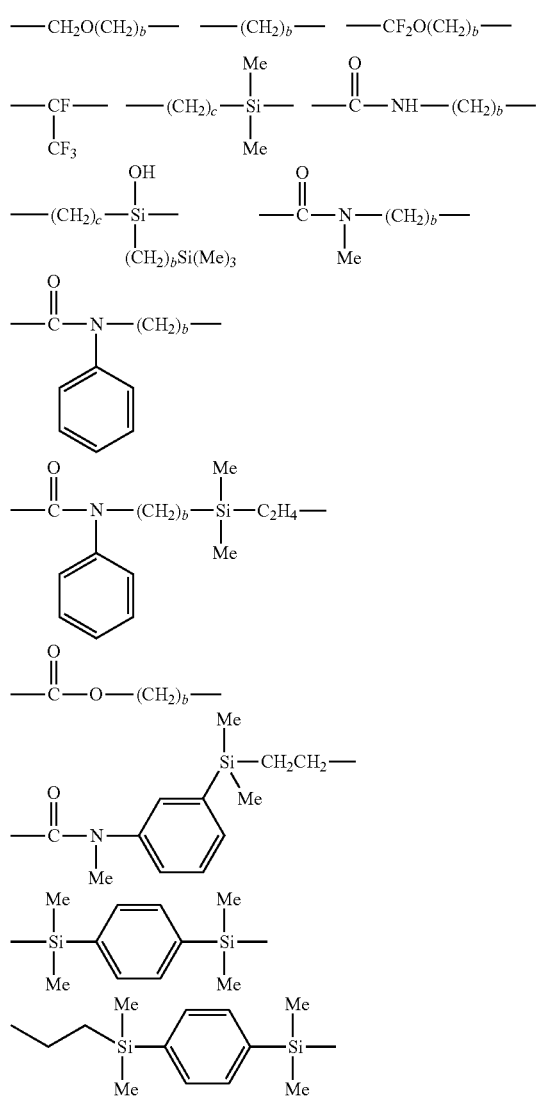

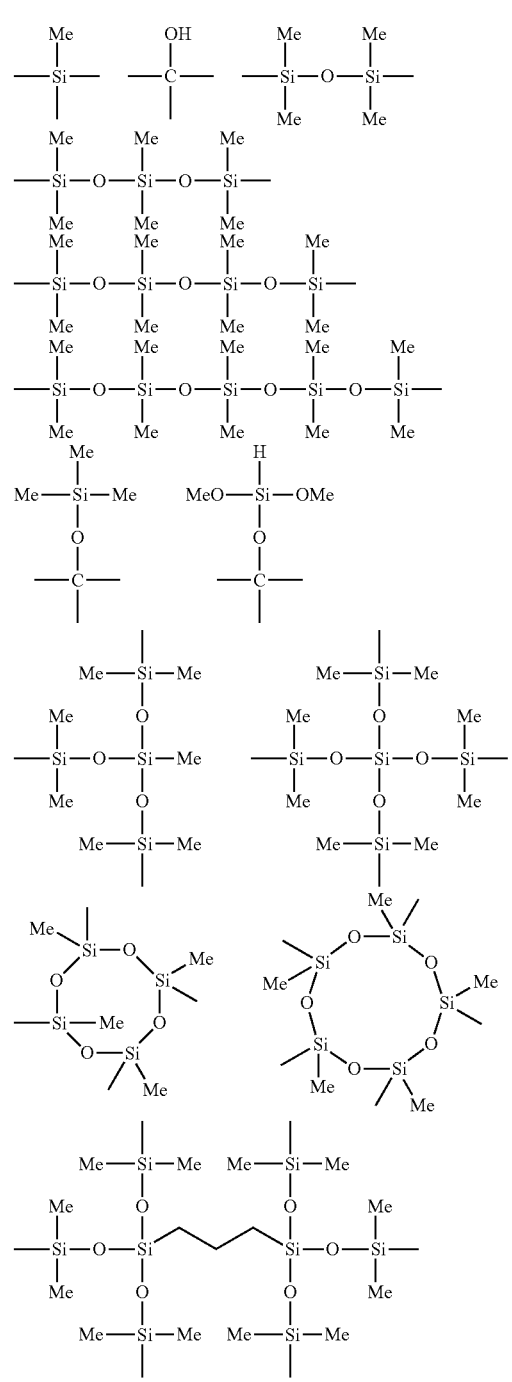

Herein b is an integer of 2 to 4, and c is an integer of 0 to 4.

In formulae (3) and (4), Z is selected from among a single bond, a trivalent group: -JC≡ (wherein J is an alkyl, preferably $C_1$-$C_3$ alkyl, hydroxyl or silyl ether group: $K_3$SiO— wherein K is independently hydrogen, alkyl, preferably $C_1$-$C_3$ alkyl, aryl, typically phenyl, or alkoxy, preferably $C_1$-$C_3$ alkoxy), a trivalent group: -LSi≡ (wherein L is alkyl, preferably $C_1$-$C_3$ alkyl), a tetravalent group: —C≡, a tetravalent group: —Si≡, and a di- to octavalent, prefer-

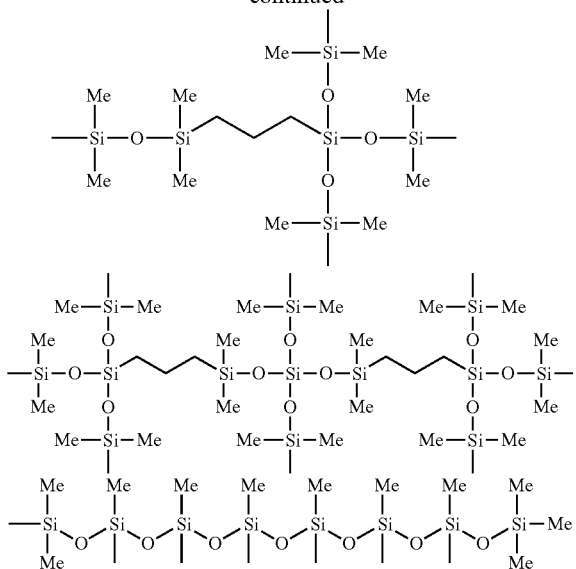

In formulae (3) and (4), W is a hydrolyzable group-bearing group having the general formula (7):

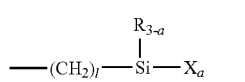
(7)

wherein R, X and a are as defined above, and l is an integer of 0 to 10, preferably 2 to 8.

Typical examples of W are shown by the formula:

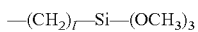

wherein l is as defined above.

In formulae (3) and (4), a is an integer of 1 to 7, preferably 1 to 3.

In formulae (5) and (6), Y is a divalent group having a hydrolyzable group X, represented by the general formula (8), (9), (10) or (10').

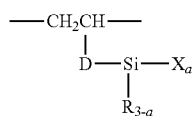
(8)

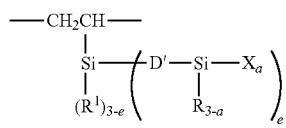
(9)

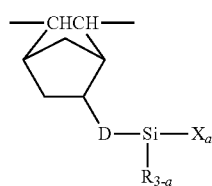
(10)

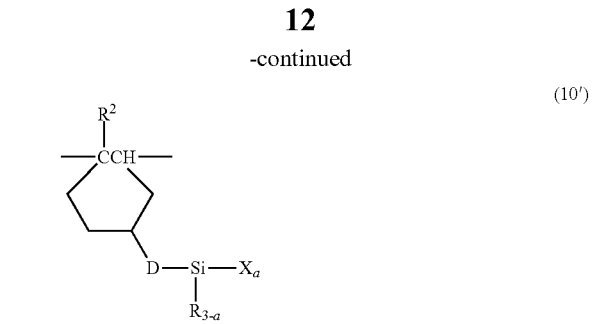
(10')

Herein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, $R^2$ is hydrogen or methyl, and e is 1 or 2.

In formulae (8) to (10'), R, X and a are as defined above. D is a single bond or an optionally fluorinated divalent organic group of 1 to 20 carbon atoms, preferably 2 to 8 carbon atoms, specifically divalent hydrocarbon group. D' is an optionally fluorinated divalent organic group of 1 to 10 carbon atoms, preferably 2 to 8 carbon atoms, specifically divalent hydrocarbon group. Suitable divalent hydrocarbon groups represented by D and D' include alkylene groups such as methylene, ethylene, propylene (trimethylene or methylethylene), butylene (tetramethylene or methylpropylene), hexamethylene, and octamethylene, arylene groups such as phenylene, combinations of two or more of the foregoing, such as alkylene-arylene groups, and substituted forms of the foregoing in which some or all hydrogen atoms are substituted by fluorine. Preferably, D is ethylene, propylene or phenylene, and D' is ethylene or propylene.

$R^1$ is a $C_1$-$C_{20}$, preferably $C_1$-$C_{10}$ monovalent hydrocarbon group. Examples include alkyl groups such as methyl, ethyl, propyl, isopropyl, butyl, isobutyl, tert-butyl, pentyl, neopentyl, hexyl, and octyl, cycloalkyl groups such as cyclohexyl, alkenyl groups such as vinyl, allyl, and propenyl, aryl groups such as phenyl and tolyl, and aralkyl groups such as benzyl, phenylethyl, and phenylpropyl. Inter alia, methyl is preferred. $R^2$ is hydrogen or methyl.

Examples of Y are shown below.

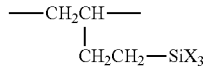
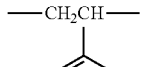
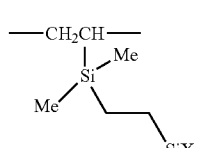
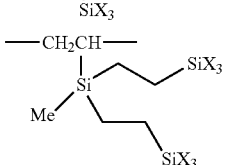
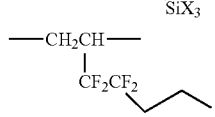
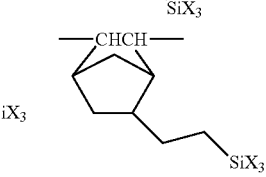

-continued

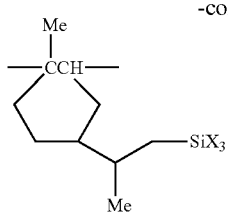

Herein X is as defined above.

In formulae (5) and (6), β is an integer of 1 to 10, preferably 1 to 4. B is hydrogen, a $C_1$-$C_4$ alkyl group such as methyl, ethyl, propyl or butyl, or halogen.

Shown below are examples of the fluoropolyether-containing polymer-modified silanes having formulae (3) and (4) wherein the linker Q has the following formula:

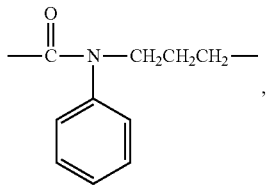

the group Z has the following formula:

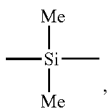

and the hydrolyzable group-bearing group W has the following formula:

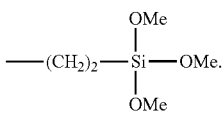

The combination of Q, Z and W is not limited to the above. A series of fluoropolyether-containing polymer-modified silanes are obtained by merely changing Q, Z and W. The desired effect is exerted by any of these fluoropolyether-containing polymer-modified silanes.

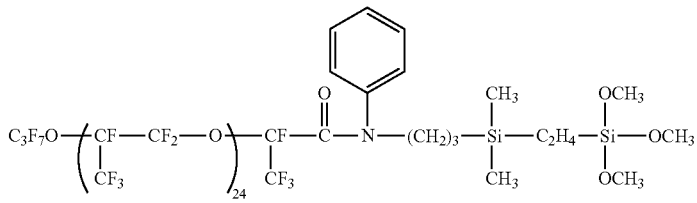

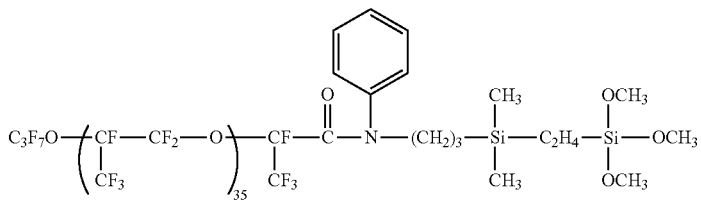

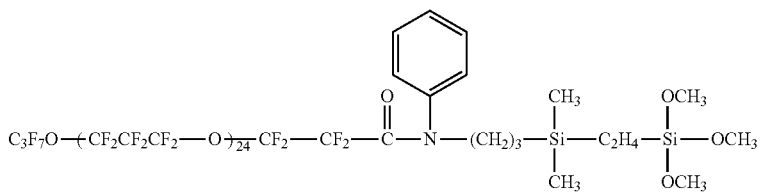

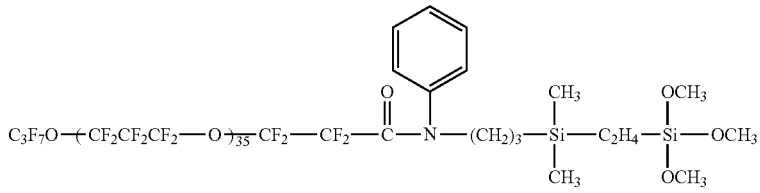

-continued
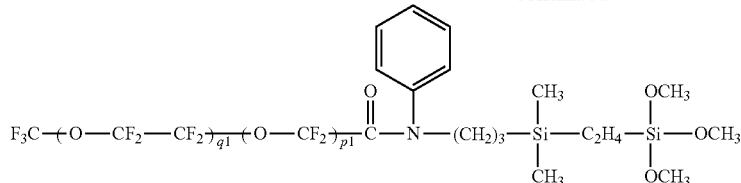
p1 + q1 = 23
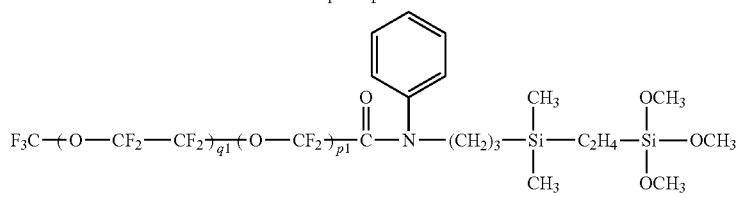
p1 + q1 = 45
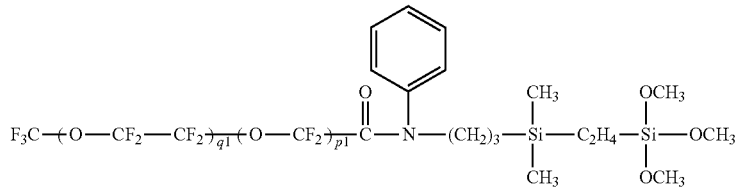
p1 + q1 = 60
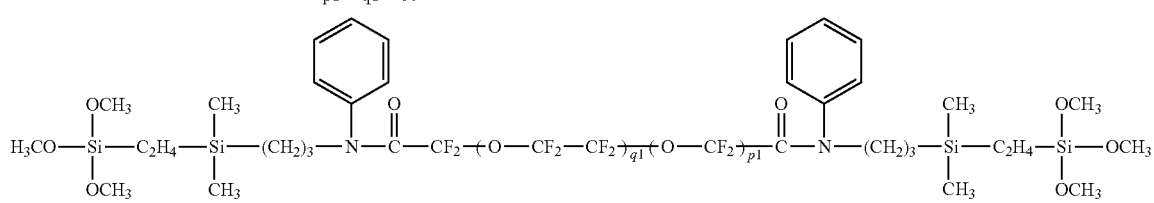
p1 + q1 = 23
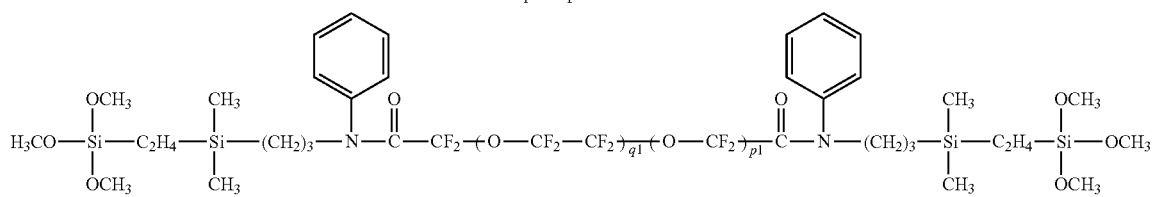
p1 + q1 = 45
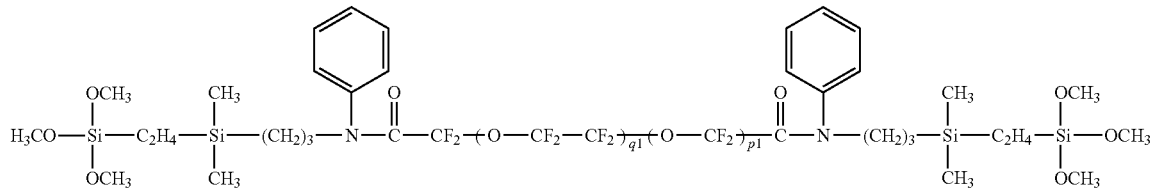
p1 + q1 = 60
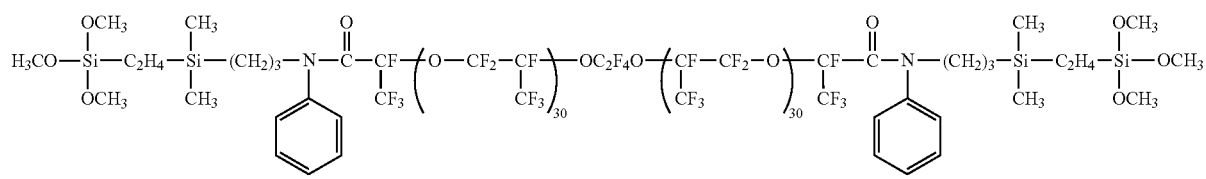
Further examples of the fluoropolyether-containing polymer-modified silanes having formulae (3) and (4) wherein groups Q, Z and W different from the above-mentioned groups are combined are given by the following structures.

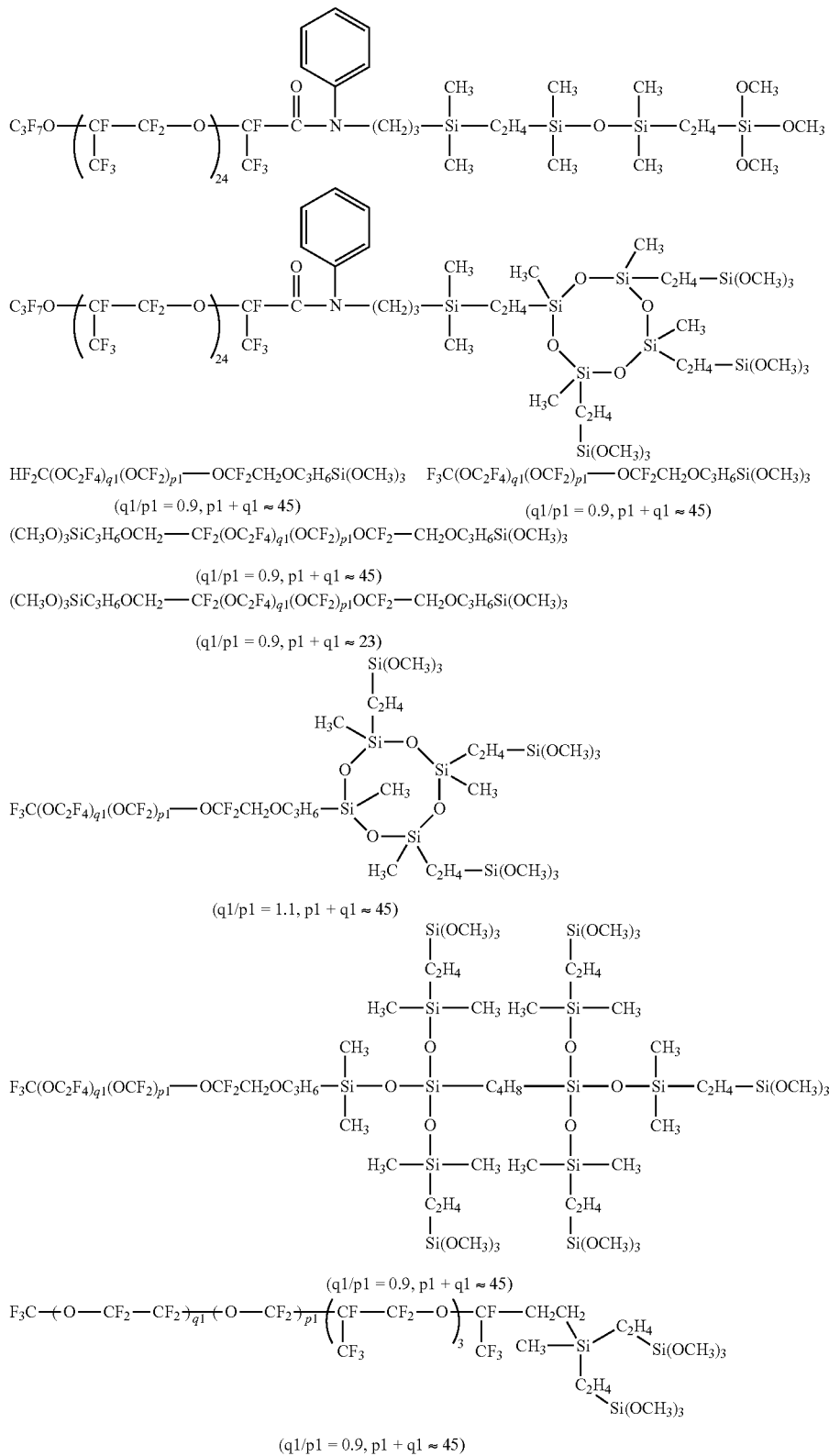
Examples of the fluoropolyether-containing polymer-modified silanes having formulae (5) and (6) are given by the following structures.

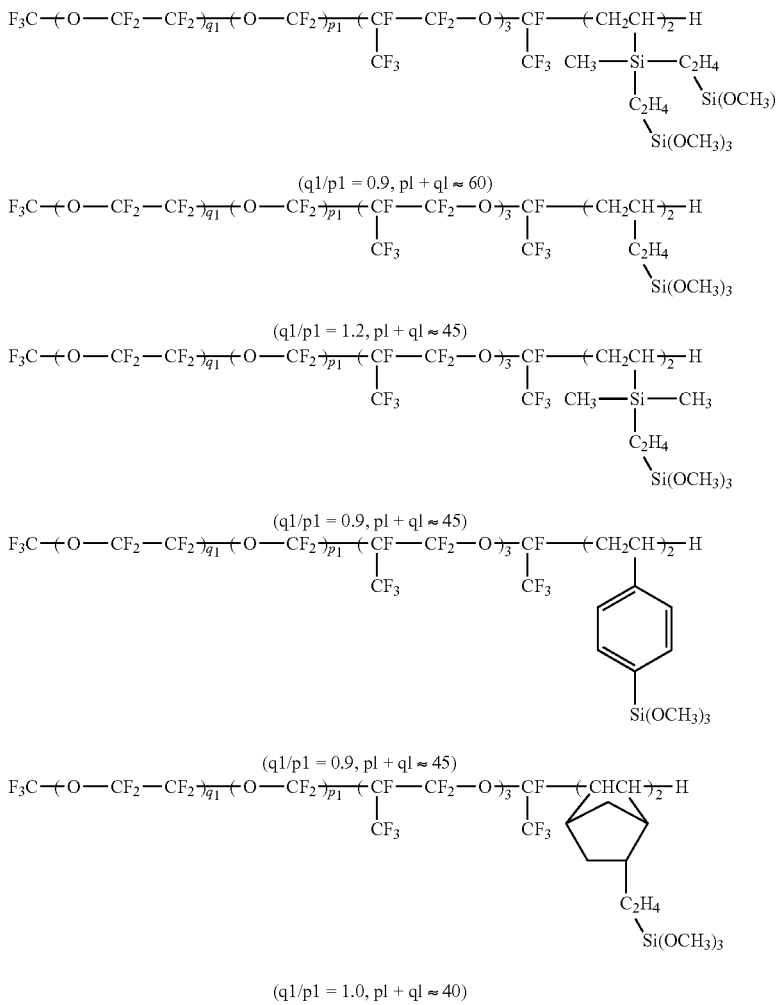

The fluorochemical coating composition may comprise as component (A) a partial hydrolytic condensate obtained by previously subjecting the fluoropolyether-containing polymer-modified silane (specifically its terminal hydrolyzable group) to partial hydrolysis and condensation in a well-known manner.

Notably, component (A) preferably has a weight average molecular weight (Mw) of 1,000 to 20,000, more preferably 2,000 to 10,000. With too low Mw, water/oil repellency and low dynamic friction attributable to the fluoropolyether group may not be fully exerted. With too high Mw, adhesion to substrates may be poor. As used herein, the weight average molecular weight (Mw) is determined by gel permeation chromatography (GPC) versus polystyrene standards using fluorocarbon AK-225 (Asahi Glass Co., Ltd.) as developing solvent.

In addition to component (A) described above, the fluorochemical coating composition comprises (B) a hydrolyzable group-containing silane modified with a fluoropolyether-polysiloxane copolymer and/or a partial hydrolytic condensate thereof.

Component (A) is characterized by likelihood of polymer molecules agglomerating together whereas component (B) is characterized by unlikelihood of agglomeration. Components (A) and (B) are compatible with each other since they both have fluoropolyether portions. When components (A) and (B) are mixed together, component (B) functions to inhibit the polymer component from agglomeration.

In one embodiment, component (B) is a silane containing 10 to 200, preferably 20 to 100 repeating units of the general formula (1):

$$-C_gF_{2g}O- \qquad (1)$$

wherein g is independently in each unit an integer of 1 to 6, as the fluoropolyether portion, and 3 to 200, preferably 10 to 100 siloxane bonds as the polysiloxane portion.

Examples of the repeating unit of formula (1), which is the fluoropolyether portion, are shown below. It is understood that the fluoropolyether portion may be composed of repeating units of one type or combination of two or more types, while individual repeating units may be randomly arranged.

$-CF_2O-$ $-CF_2CF_2O-$ $-CF_2CF_2CF_2O-$ $-CF(CF_3)CF_2O-$ $-CF_2CF_2CF_2CF_2O-$

—CF$_2$CF$_2$CF$_2$CF$_2$CF$_2$O—

—CF$_2$CF$_2$CF$_2$CF$_2$CF$_2$CF$_2$O—

—C(CF$_3$)$_2$O—

The polysiloxane portion contains 3 to 200, preferably 10 to 100 siloxane bonds. With less siloxane bonds, the leveling effect of smoothing the surface may become too weak to reduce haze. With too much siloxane bonds, component (B) may become less compatible with component (A). Illustrative examples of the polysiloxane portion are shown below.

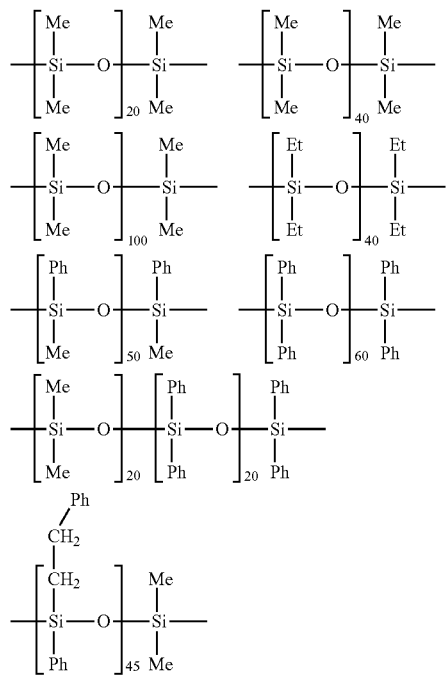

The hydrolyzable group-containing silane modified with a fluoropolyether-polysiloxane copolymer as component (B) is preferably selected from fluoropolyether-polysiloxane copolymer-modified silanes having the general formulae (11) and (12).

$$A\text{-}Rf'\text{-}QZW_\alpha \quad (11)$$

$$Rf'\text{-}(QZW_\alpha)_2 \quad (12)$$

Herein Rf' is a divalent group containing fluoropolyether-polysiloxane copolymer, A, Q, Z, W, and a are as defined above.

In formulae (11) and (12), example of A, Q, Z, W, and a are as exemplified previously. Specifically, preferred examples of A include —CF$_3$, —CF$_2$CF$_3$, —CF$_2$CF$_2$CF$_3$, —CF$_2$H, and —CH$_2$F. Q is preferably a group of the formula: —CH$_2$O(CH$_2$)$_b$— wherein b is as defined above. Preferred examples of Z are shown below.

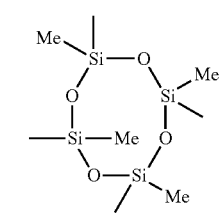

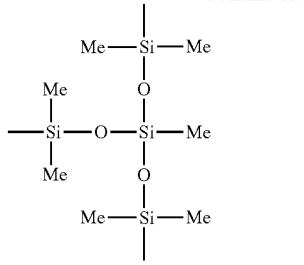

Herein f is an integer of 1 to 200, preferably 10 to 100. Preferred examples of W are shown below.

—(CH$_2$)$_l$—Si—(OCH$_3$)$_3$

—(CH$_2$)$_l$—Si—(OCH$_2$CH$_3$)$_3$

—(CH$_2$)$_l$—Si—(OCH$_2$CF$_3$)$_3$

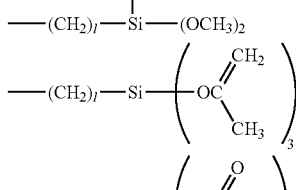

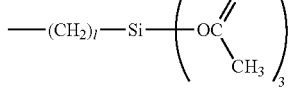

Herein l is as defined above.

In formulae (11) and (12), Rf' is preferably a group having the general formula (13) or (14):

$$-(Z'\text{-}Q)_h\text{-}Rf\text{-}(Q\text{-}Z')_h\text{-} \quad (13)$$

$$-Rf\text{-}(Q\text{-}Z'\text{-}Q\text{-}Rf)_i\text{-} \quad (14)$$

wherein Rf and Q are as defined above, Z' is each independently a divalent polysiloxane chain, h is independently 0 or 1, and i is an integer of 1 to 3.

In formulae (13) and (14), examples of Rf and Q are as exemplified previously. More preferably, Rf is a group of the formula:

—CF$_2$—O—(CF$_2$O)$_{p2}$(CF$_2$CF$_2$O)$_{q2}$—CF$_2$— wherein p2 is an integer of 5 to 100, preferably 10 to 50, and q2 is an integer of 5 to 100, preferably 10 to 50; Q is a single bond or a group of the formula: —CH$_2$O(CH$_2$)$_b$— wherein b is as defined above.

In formulae (13) and (14), Z' is a polysiloxane-containing divalent group, which may be either linear or branched. Typical of the polysiloxane structure is a polysiloxane chain having the general formula (15) or (16), for example, polydimethylsiloxane.

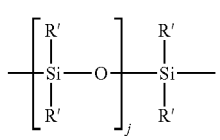 (15)

Herein R' is each independently $C_1$-$C_4$ alkyl (e.g., methyl, ethyl, propyl or butyl), phenyl or phenylethyl, j is an integer of 10 to 200, preferably 15 to 100, more preferably 20 to 80.

(16)

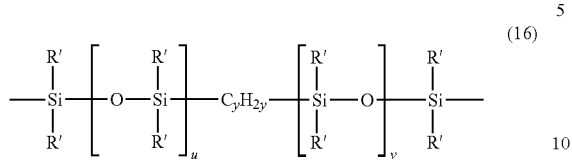

Herein R' is as defined above, y is an integer of 1 to 5, u and v are each independently an integer of 1 to 200, preferably 1 to 100, and more preferably 10 to 60, the sum u+v is an integer of 10 to 201, preferably 20 to 80.

Illustrative examples of Z' are shown below.

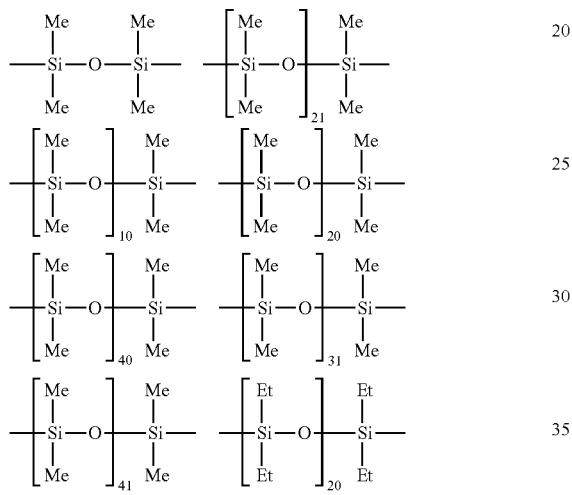

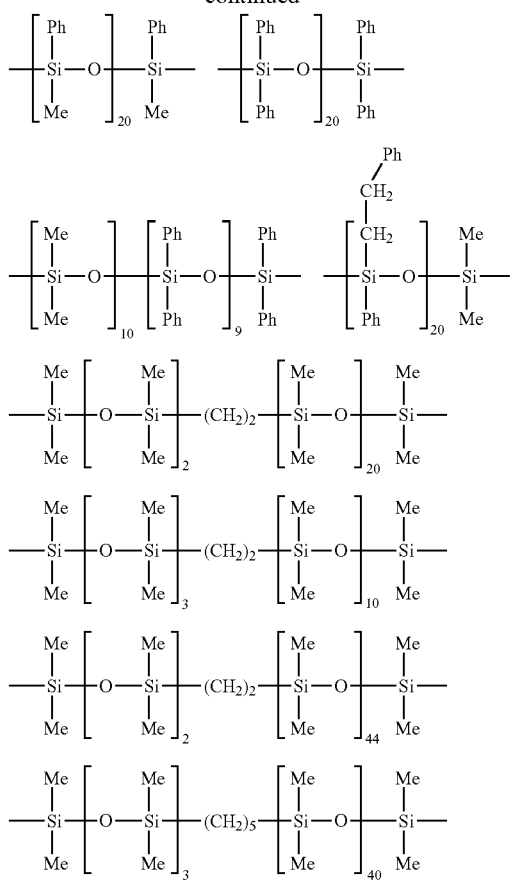

In formulae (11) and (12), examples of Rf' are shown below.

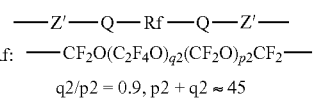

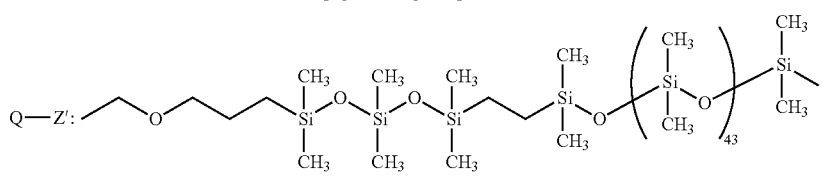

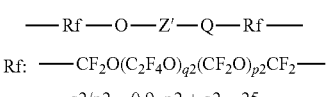

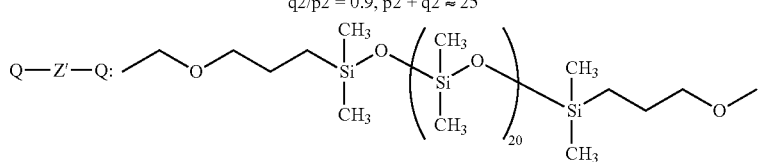

—RfQZ'—
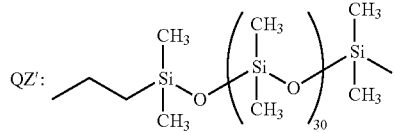
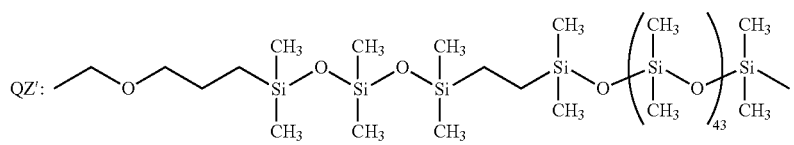
Examples of the fluoropolyether-polysiloxane copolymer-modified silanes having formulae (11) and (12) are shown by the following structures.
WZQ—Z'Q—Rf—QZ'—QZW
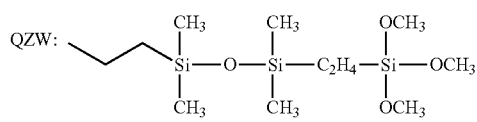
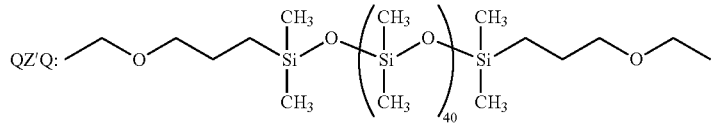
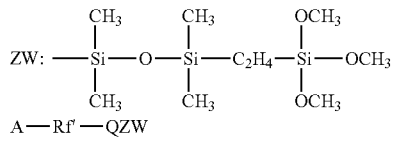
A—Rf'—QZW
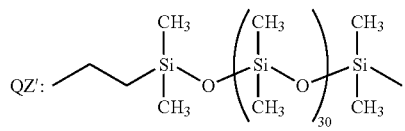
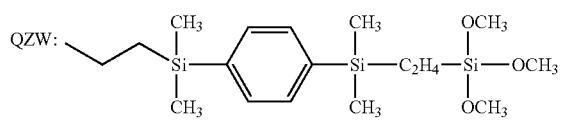

Herein Z is a single bond.

The fluorochemical coating composition may comprise as component (B) a partial hydrolytic condensate obtained by previously subjecting the hydrolyzable group-containing silane modified with a fluoropolyether-polysiloxane copolymer (specifically its terminal hydrolyzable group) to partial hydrolysis and condensation in a well-known manner.

Notably, component (B) preferably has a weight average molecular weight (Mw) of 1,000 to 50,000, more preferably 2,000 to 20,000. Component (B) with too low Mw may detract from the lubricity of component (A). With too high Mw, adhesion to substrates may be poor.

In the fluorochemical coating composition, (A) the hydrolyzable group-containing silane modified with a fluoropolyether-containing polymer and/or a partial hydrolytic condensate thereof and (B) the hydrolyzable group-containing silane modified with a fluoropolyether-polysiloxane copolymer and/or a partial hydrolytic condensate thereof are present in a weight ratio (A)/(B) of 40/60 to 95/5, preferably 50/50 to 95/5. Outside the range, an excess of component (B) detracts from the antifouling characteristics of component (A) whereas a lower content of component (B) fails to suppress agglomeration and detracts from the texture and other properties of the substrate, with a loss of visibility.

The fluorochemical coating composition may further comprise (C) a fluoropolyether-containing polymer having the general formula (17):

A-Rf-A (17)

wherein Rf and A are as defined above. This polymer is also referred to as "nonfunctional polymer."

In formula (17), examples of Rf and A are as exemplified previously. Rf may be identical with or different from Rf in components (A) and (B). Preferred examples of Rf are given below.

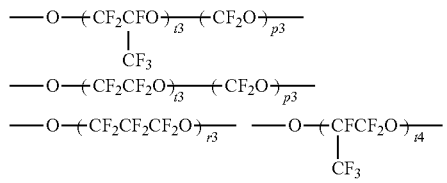

Herein p3 is an integer of 5 to 200, preferably 10 to 100; q3 is an integer of 5 to 200, preferably 10 to 100; r3 is an integer of 10 to 200, preferably 20 to 100; t3 is an integer of 5 to 200, preferably 10 to 100; t3+p3 is an integer of 10 to 200, preferably 20 to 100; q3+p3 is an integer of 10 to 200, preferably 20 to 100; t4 is an integer of 10 to 200, preferably 20 to 100. Preferred examples of A are —F, —CF$_3$, —CF$_2$CF$_3$, and —CF$_2$CF$_2$CF$_3$.

Examples of the nonfunctional polymer having formula (17) are shown below.

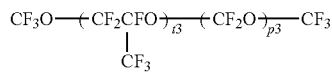
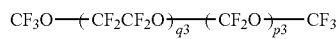
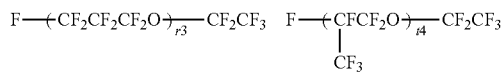

Herein p3, q3, r3, t3, and t4 are as defined above and such numbers that the number of repeating units in the fluoropolyether-containing polymer may range from 10 to 100.

Component (C) preferably has a weight average molecular weight (Mw) of 1,000 to 50,000, more preferably 2,000 to 15,000. Component (C) with too low Mw may detract from the lubricity of component (A). Component (C) with too high Mw may adversely affect the compatibility between components (A) and (B), leading to an increased haze.

Preferably the Mw of component (C) is greater than the Mw of fluoropolyether chain in component (B) by a factor of 0.25 to 4, although the factor varies depending on the length of fluoropolyether chain in component (B) and the combination with non-fluorinated portion. If the Mw of fluoropolyether chain in component (B) is too high, component (B) may be incompatible with component (C).

Any commercial products may be used as the nonfunctional polymer or component (C). The polymer is commercially available under the trade name of Fomblin®, Demnum®, and Krytox®, for example. These polymers are described below.

Fomblin Y, typically Fomblin Y25 (Mw: 3,200) and Fomblin Y45 (Mw: 4,100) of the following structure are available from Solvay Solexis.

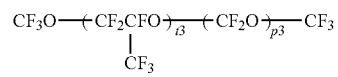

Herein t3 and p3 are such numbers as to meet the specified Mw.

Fomblin Z, typically Fomblin Z03 (Mw: 4,000), Fomblin Z15 (Mw: 8,000), and Fomblin Z25 (Mw: 9,500) of the following structure are available from Solvay Solexis.

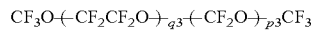

Herein q3 and p3 are such numbers as to meet the specified Mw.

Demnum, typically Demnum S20 (Mw: 2,700), Demnum S65 (Mw: 4,500), and Demnum S100 (Mw: 5,600) of the following structure are available from Daikin Industries, Ltd.

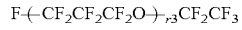

Herein r3 is such a number as to meet the specified Mw.

Krytox, typically Krytox 143AB (Mw: 3,500), Krytox 143AX (Mw: 4,700), Krytox 143AC (Mw: 5,500), and Krytox 143AD (Mw: 7,000) of the following structure are available from E.I. duPont.

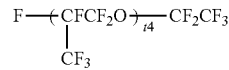

Herein t4 is such a number as to meet the specified Mw.

Component (C) may be used in any desired amount, preferably in an amount of 0 to 50% by weight based on the total weight of components (A) and (B). Too much amounts of component (C) may be detrimental to adhesion. When used, the lower limit amount of component (C) is preferably at least 5% by weight because the effect of component (C) becomes significant.

A suitable solvent may be added to the fluorochemical coating composition so as to provide an appropriate concentration for a particular coating technique. Suitable solvents include fluorine-modified aliphatic hydrocarbon solvents such as perfluorohexane, perfluoroheptane, perfluorooctane, and pentafluorobutane; fluorine-modified aromatic hydrocarbon solvents such as m-xylene hexafluoride, benzotrifluoride, and 1,3-trifluoromethylbenzene; fluorine-modified ether solvents such as methyl perfluorobutyl ether, ethyl perfluorobutyl ether, and perfluoro(2-butyl-tetrahydrofuran); fluorine-modified alkylamine solvents such as perfluorotributylamine and perfluorotripentylamine; hydrocarbon solvents such as petroleum benzine, mineral spirits, toluene, and xylene; ketone solvents such as acetone, methyl ethyl ketone, and methyl isobutyl ketone. Of these, fluorine-modified solvents are desirable for solubility and wettability, with ethyl perfluorobutyl ether and decafluoropentane being more desirable.

The solvents may be used alone or in admixture of two or more while it is preferred that components (A) to (C) be uniformly dissolved in the solvent. An optimum concentration of components (A) to (C) in the solvent is 0.01 to 50% by weight, especially 0.05 to 20% by weight, though it varies with a particular treating technique.

To the fluorochemical coating composition, other additives may be added, if necessary, as long as the objects of the invention are not impaired. Suitable hydrolytic condensation catalysts include organotin compounds such as dibutyltin dimethoxide and dibutyltin dilaurate, organotitanium compounds such as tetra-n-butyl titanate, organic acids such as fluorinated carboxylic acids, acetic acid, and methanesulfonic acid, and inorganic acids such as hydrochloric acid and sulfuric acid. Of these, fluorinated carboxylic acids, acetic acid, tetra-n-butyl titanate, and dibutyltin dilaurate are preferred. The catalyst may be added in a catalytic amount, typically 0.01 to 5 parts, more preferably 0.1 to 1 part by weight per 100 parts by weight of component (A).

The fluorochemical coating composition may be applied to a substrate by any well-known techniques such as brush coating, dipping, spraying, inkjet coating, and evaporation. A coating is cured to the substrate. The curing temperature varies with a particular coating or curing technique. For example, the curing temperature is desirably in a range of room temperature to 200° C., more desirably 50 to 150° C. when the coating technique is spraying, inkjet coating, dipping, brush coating or vacuum evaporation. With respect to humidity, humid curing conditions are desirable to accelerate the reaction. The cured coating desirably has a thickness of 0.1 to 100 nm, more desirably 3 to 30 nm although the thickness depends on the type of substrate.

Where the fluorochemical coating composition contains hydrolyzable groups, a silicon oxide ($SiO_2$) layer is formed on the substrate as a primer before the fluorochemical coating composition is coated thereon. If the substrate is of glass or similar material capable of bonding directly with hydrolyzable groups, the $SiO_2$ layer need not be formed. If the substrate is less adherent, adhesion may be improved by forming a $SiO_2$ layer as the primer layer or by suitable pretreatment such as vacuum plasma treatment, atmospheric plasma treatment or alkali treatment.

The substrate to be treated with the fluorochemical coating composition is not particularly limited, and may be made of any desired materials including paper, fabric, metals, metal oxides, glass, plastics, ceramics, and quartz. The fluorochemical coating composition is effective for endowing the substrate with water/oil repellency, chemical resistance, parting properties, low dynamic friction, and antifouling properties. Examples of the article treated with the fluorochemical coating composition include touch panels, antireflective coated articles, glass, strengthened glass, sapphire glass, quartz glass, and $SiO_2$-deposited substrates.

EXAMPLE

Examples of the invention are given below by way of illustration and not by way of limitation.

As the hydrolyzable group-containing silane modified with a fluoropolyether-containing polymer, there were furnished Compounds 1 to 3 shown below.

Compound 1

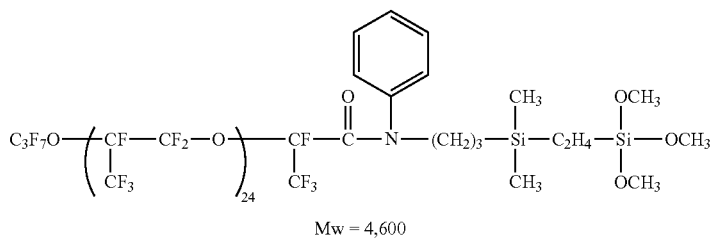

Mw = 4,600

Compound 2

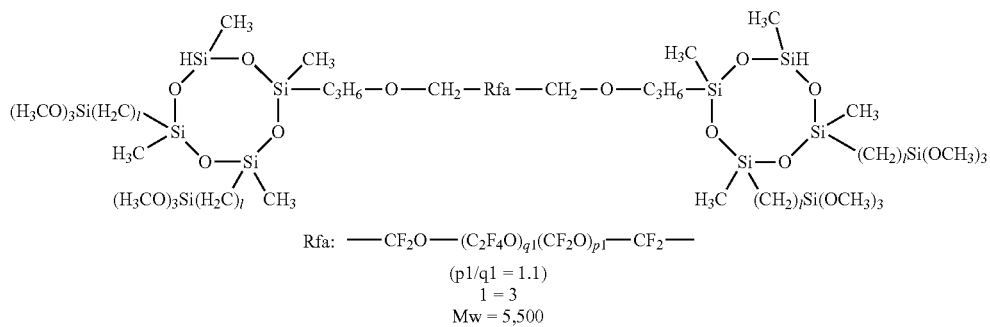

Rfa: —$CF_2O$—$(C_2F_4O)_{q1}(CF_2O)_{p1}$—$CF_2$—
(p1/q1 = 1.1)
l = 3
Mw = 5,500

-continued

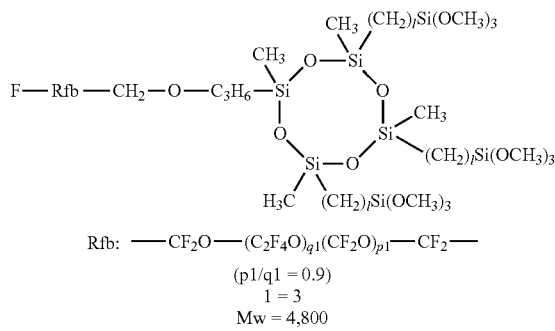
Compound 3

As the hydrolyzable group-containing silane modified with a fluoropolyether-polysiloxane copolymer, there were furnished Compounds 4 and 5 shown below.

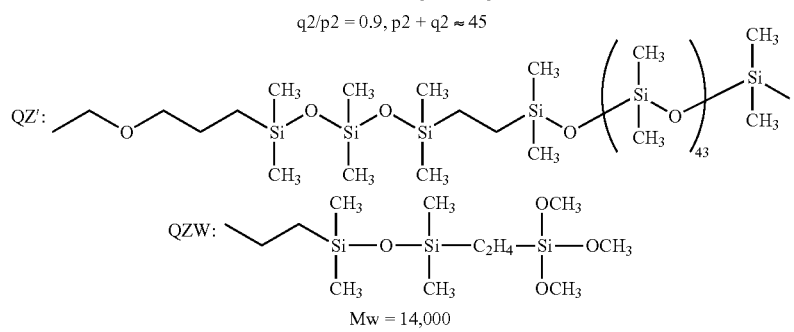
Compound 4

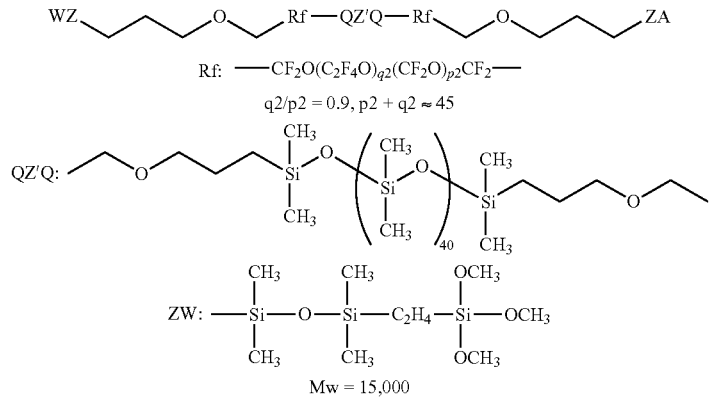
Compound 5

Preparation of Coating Composition and Formation of Cured Film

Coating compositions were prepared by combining components (A) and (B) in the weight ratio shown in Table 1, dissolving them in solvent Novec® 7200 (ethyl perfluorobutyl ether by 3M) in a solid concentration of 0.5 wt %. A glass plate (Gorilla® II by Corning) was dipped in the coating composition bath for 60 seconds, pulled up at a rate of 300 mm/min, and held at 80° C. in an atmosphere of humidity 80% for 1 hour. In this way, the coating is cured into a cured film of about 20 nm thick, obtaining a test sample.

TABLE 1

|  |  | Component A | Component B | B/(A + B), wt % |
|---|---|---|---|---|
| Example | 1 | Compound 1 | Compound 4 | 30 |
|  | 2 | Compound 2 | Compound 4 | 30 |
|  | 3 | Compound 3 | Compound 4 | 30 |
|  | 4 | Compound 2 | Compound 5 | 5 |
|  | 5 | Compound 2 | Compound 5 | 10 |
|  | 6 | Compound 2 | Compound 5 | 20 |
|  | 7 | Compound 2 | Compound 5 | 40 |
|  | 8 | Compound 2 | Compound 5 | 50 |
|  | 9 | Compound 3 | Compound 4 | 50 |

TABLE 1-continued

| | | Component A | Component B | B/(A + B), wt % |
|---|---|---|---|---|
| Comparative Example | 1 | Compound 1 | — | 0 |
| | 2 | Compound 2 | — | 0 |
| | 3 | Compound 3 | — | 0 |
| | 4 | Compound 2 | Compound 5 | 70 |
| | 5 | Compound 2 | Compound 5 | 2 |
| | 6 | — | Compound 5 | 100 |

The sample (or cured film) was evaluated by the following tests. All the tests were performed at 25° C. and humidity 50%. The results are shown in Table 2.

Water/Oil Repellency

Using a contact angle meter Drop Master (Kyowa Interface Science Co., Ltd.), the cured film was measured for a contact angle with water (droplet: 2 μl) as an index of water repellency and with oleic acid (droplet: 5 μl) as an index of oil repellency.

Haze

Using a haze meter NDH-500 (Nippon Denshoku Co., Ltd.), the sample was measured for haze according to JIS K 7136.

Dynamic Friction

Using a surface property tester 14FW (Shinto Scientific Co., Ltd.), the sample was measured for a coefficient of dynamic friction relative to non-woven fabric Bemcot® (Asahi Kasei Fibers Corp.) over a contact area of 10 mm×35 mm and under a load of 200 g.

Oil Wipe-Off

On the sample surface, a droplet (5 μl) of oleic acid was dropped. The sample surface was wiped 10 strokes with non-woven fabric Bemcot® under a load of 250 g/cm² before it was measured for haze. For the wiping operation, the surface property tester 14FW was used.

TABLE 2

| | | Contact angle with water (°) | Contact angle with oleic acid (°) | Haze | Coefficient of dynamic friction | Oil wipe-off |
|---|---|---|---|---|---|---|
| Example | 1 | 111 | 68 | 0.38 | 0.04 | 0.39 |
| | 2 | 112 | 67 | 0.35 | 0.03 | 0.37 |
| | 3 | 108 | 62 | 0.32 | 0.04 | 0.35 |
| | 4 | 114 | 70 | 0.40 | 0.03 | 0.42 |
| | 5 | 114 | 69 | 0.38 | 0.03 | 0.39 |
| | 6 | 113 | 68 | 0.35 | 0.03 | 0.37 |
| | 7 | 112 | 65 | 0.34 | 0.03 | 0.37 |
| | 8 | 111 | 63 | 0.35 | 0.03 | 0.36 |
| | 9 | 107 | 61 | 0.38 | 0.03 | 0.38 |
| Comparative Example | 1 | 115 | 72 | 0.88 | 0.28 | 0.55 |
| | 2 | 115 | 70 | 1.34 | 0.03 | 0.98 |
| | 3 | 108 | 68 | 1.55 | 0.09 | 0.74 |
| | 4 | 110 | 59 | 0.35 | 0.03 | 0.55 |
| | 5 | 115 | 70 | 0.52 | 0.03 | 0.42 |
| | 6 | 107 | 59 | 0.28 | 0.03 | 0.58 |

As is evident from the test results, the coating compositions of Comparative Examples 1 to 3 using component (A) alone showed a haze in excess of 5 as a result of polymer molecules agglomerating together, indicating a lack of visibility. The coating composition of Comparative Example 6 using component (B) alone showed insufficient oil wipe-off after the sample surface was stained with oleic acid.

The coating compositions of Examples 1 to 9 in which component (B) was 5 to 50 wt % based on the weight of components (A) and (B) combined were effective for preventing polymer molecules from agglomerating together, and suppressing any haze increase.

Although the coating compositions of Comparative Examples 1 and 3 using component (A) alone showed a high coefficient of dynamic friction, the coating compositions of Examples 1, 3 and 9 using a mixture of components (A) and (B) in a specific ratio showed a coefficient of dynamic friction of less than 0.05.

The coating composition of Comparative Example 4 containing more than 60 wt % of component (B) showed a decline of contact angle with oleic acid below 60°. The coating composition of Comparative Example 5 containing less than 5 wt % of component (B) failed to suppress a haze increase.

It is demonstrated that the fluorochemical coating composition comprising the hydrolyzable group-containing silane modified with a fluoropolyether-containing polymer and/or a partial hydrolytic condensate thereof, and the hydrolyzable group-containing silane modified with a fluoropolyether-polysiloxane copolymer and/or a partial hydrolytic condensate thereof forms a cured film having water/oil repellency and a low haze. Therefore, the fluorochemical coating composition is advantageously applicable to touch panel displays, antireflective films and other articles which are expected to be stained with oils and fats and required to maintain visibility.

Japanese Patent Application No. 2014-074094 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorochemical coating composition comprising (A) a hydrolyzable group-containing silane modified with a fluoropolyether-containing polymer and/or a partial hydrolytic condensate thereof, and (B) a hydrolyzable group-containing silane modified with a fluoropolyether-polysiloxane copolymer and/or a partial hydrolytic condensate thereof, in a weight ratio (A)/(B) of 40/60 to 95/5.

2. The fluorochemical coating composition of claim 1 wherein component (A) contains 10 to 200 repeating units of the general formula (1):

$$-C_gF_{2g}O- \quad (1)$$

wherein g is independently in each unit an integer of 1 to 6, as the fluoropolyether group, and has at least one hydrolyzable silyl group of the general formula (2):

$$\begin{array}{c} R_{3-a} \\ | \\ -Si-X_a \end{array} \quad (2)$$

wherein R is $C_1$-$C_4$ alkyl or phenyl, X is a hydrolyzable group, and a is 2 or 3, at one or more ends, and component (B) contains 10 to 200 repeating units of the general formula (1) as the fluoropolyether portion, and 3 to 200 siloxane bonds as the polysiloxane portion.

3. The fluorochemical coating composition of claim 1 wherein the hydrolyzable group-containing silane modified with a fluoropolyether-containing polymer (A) is at least one member selected from fluoropolyether-containing polymer-modified silanes having the general formulae (3), (4), (5) and (6):

$$A\text{-}Rf\text{-}QZ(W)_\alpha \quad (3)$$

$$Rf\text{-}(QZ(W)_\alpha)_2 \quad (4)$$

A-Rf-Q-(Y)$_\beta$B　　　(5)

Rf-(Q-(Y)$_\beta$B)$_2$　　　(6)

wherein Rf is —(CF$_2$)$_d$—O—(CF$_2$O)$_p$(CF$_2$CF$_2$O)$_q$(CF$_2$CF$_2$CF$_2$O)$_r$—(CF$_2$CF$_2$CF$_2$CF$_2$O)$_s$(CF(CF$_3$)CF$_2$O)$_t$—(CF$_2$)$_d$—, d is independently an integer of 0 to 5, p, q, r, s and t are each independently an integer of 0 to 200, p+q+r+s+t is an integer of 10 to 200, individual units in parentheses may be randomly arranged, A is fluorine, hydrogen, or a monovalent fluorinated group terminated with —CF$_3$, —CF$_2$H or —CH$_2$F radical, Q is a single bond or an optionally fluorinated divalent organic group, Z is a single bond, a trivalent group: -JC≡ (wherein J is an alkyl, hydroxyl or silyl ether group: K$_3$SiO— wherein K is independently hydrogen, alkyl, aryl or alkoxy), a trivalent group: -LSi≡ (wherein L is alkyl), a tetravalent group: —C≡, a tetravalent group: —Si≡, or a di- to octavalent siloxane residue, W is a hydrolyzable group-bearing group having the general formula (7):

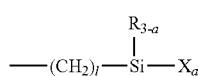　　　(7)

wherein R is C$_1$-C$_4$ alkyl or phenyl, X is a hydrolyzable group, a is 2 or 3, and l is an integer of 0 to 10, α is an integer of 1 to 7, Y is a hydrolyzable group-bearing divalent group having the general formula (8), (9), (10) or (10'):

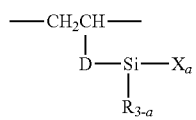　　　(8)

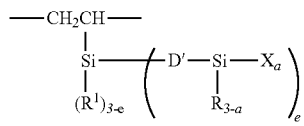　　　(9)

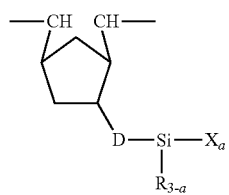　　　(10)

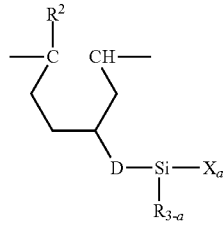　　　(10')

wherein R, X and a are as defined above, D is a single bond or an optionally fluorinated C$_1$-C$_{20}$ divalent organic group, D' is an optionally fluorinated C$_1$-C$_{10}$ divalent organic group, R' is a C$_1$-C$_{20}$ monovalent hydrocarbon group, R$^2$ is hydrogen or methyl, and e is 1 or 2, β is an integer of 1 to 10, and B is hydrogen, C$_1$-C$_4$ alkyl or halogen.

4. The fluorochemical coating composition of claim 1 wherein the hydrolyzable group-containing silane modified with a fluoropolyether-polysiloxane copolymer (B) is at least one member selected from fluoropolyether-polysiloxane copolymer-modified silanes having the general formulae (11) and (12):

A-Rf'-QZW$_\alpha$　　　(11)

Rf'-(QZW$_\alpha$)$_2$　　　(12)

wherein Rf' is a divalent group containing fluoropolyether-polysiloxane copolymer, A is fluorine, hydrogen, or a monovalent fluorinated group terminated with —CF$_3$, —CF$_2$H or —CH$_2$F radical, Q is a single bond or an optionally fluorinated divalent organic group, Z is a single bond, a trivalent group: -JC≡ (wherein J is an alkyl, hydroxyl or silyl ether group: K$_3$SiO— wherein K is independently hydrogen, alkyl, aryl or alkoxy), a trivalent group: -LSi≡ (wherein L is alkyl), a tetravalent group: —C≡, a tetravalent group: —Si≡, or a di- to octavalent siloxane residue, W is a hydrolyzable group-bearing group having the general formula (7):

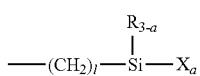　　　(7)

wherein R is C$_1$-C$_4$ alkyl or phenyl, X is a hydrolyzable group, a is 2 or 3, and l is an integer of 0 to 10, and α is an integer of 1 to 7.

5. The fluorochemical coating composition of claim 4 wherein Rf' in formulae (11) and (12) is a group having the general formula (13) or (14):

—(Z'-Q)$_h$-Rf-(Q-Z')$_h$-　　　(13)

—Rf-(Q-Z'-Q-Rf)$_i$-　　　(14)

wherein Q is as defined above,

Rf is —(CF$_2$)$_d$—O—(CF$_2$O)$_p$(CF$_2$CF$_2$O)$_q$(CF$_2$CF$_2$CF$_2$O)$_r$—(CF$_2$CF$_2$CF$_2$CF$_2$O)$_s$(CF(CF$_3$)CF$_2$O)$_t$—(CF$_2$)$_d$—, d is independently an integer of 0 to 5, p, q, r, s and t are each independently an integer of 0 to 200, p+q+r+s+t is an integer of 10 to 200, individual units in parentheses may be randomly arranged, Z' is each independently a divalent polysiloxane chain, h is independently 0 or 1, and i is an integer of 1 to 3.

6. The fluorochemical coating composition of claim 5 wherein Z' in formulae (13) and (14) is a polysiloxane chain having the general formula (15) or (16):

　　　(15)

-continued

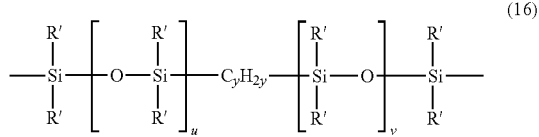
(16)

wherein R' is each independently $C_1$-$C_4$ alkyl, phenyl or phenylethyl, j is an integer of 10 to 200, y is an integer of 1 to 5, u and v are each independently an integer of 1 to 200.

7. The fluorochemical coating composition of claim 1, further comprising (C) a fluoropolyether-containing polymer having the general formula (17):

A-Rf-A  (17)

wherein Rf is $-(CF_2)_d-O-(CF_2O)_p(CF_2CF_2O)_q(CF_2CF_2CF_2O)_r-(CF_2CF_2CF_2CF_2O)_s(CF(CF_3)CF_2O)_t-(CF_2)_d-$, d is independently an integer of 0 to 5, p, q, r, s and t are each independently an integer of 0 to 200, p+q+r+s+t is an integer of 10 to 200, individual units in parentheses may be randomly arranged, and A is fluorine, hydrogen, or a monovalent fluorinated group terminated with —$CF_3$, —$CF_2H$ or —$CH_2F$ radical.

8. The fluorochemical coating composition of claim 1, further comprising a fluorochemical solvent.

9. An article treated with the fluorochemical coating composition of claim 1.

10. A touch panel treated with the fluorochemical coating composition of claim 1.

11. An antireflective coated article treated with the fluorochemical coating composition of claim 1.

12. A glass treated with the fluorochemical coating composition of claim 1.

13. A strengthened glass treated with the fluorochemical coating composition of claim 1.

14. A sapphire glass treated with the fluorochemical coating composition of claim 1.

15. A quartz glass treated with the fluorochemical coating composition of claim 1.

16. A $SiO_2$-deposited substrate treated with the fluorochemical coating composition of claim 1.

* * * * *